US011611535B2

(12) United States Patent
Velugu et al.

(10) Patent No.: US 11,611,535 B2
(45) Date of Patent: Mar. 21, 2023

(54) DYNAMICALLY SELECTING FIREWALL SIGNATURES USING NETWORK TRAFFIC

(71) Applicant: Citrix Systems, Inc., Fort Lauderdale, FL (US)

(72) Inventors: Kasirao Velugu, Bengaluru (IN); Priya Bagaria, Kolkata (IN); Ganesh Kathiresan, Bangalore (IN); Thirumoorthi Thangamani, Pallipalayam (IN)

( * ) Notice: Subject to any disclaimer, the term of this patent is extended or adjusted under 35 U.S.C. 154(b) by 24 days.

(21) Appl. No.: 17/317,538

(22) Filed: May 11, 2021

(65) Prior Publication Data

US 2022/0368672 A1    Nov. 17, 2022

(51) Int. Cl.
 *H04L 9/40*    (2022.01)

(52) U.S. Cl.
 CPC ...... *H04L 63/0263* (2013.01); *H04L 63/0236* (2013.01); *H04L 63/20* (2013.01); *H04L 63/0281* (2013.01)

(58) Field of Classification Search
 CPC . H04L 63/0263; H04L 63/0236; H04L 63/20; H04L 63/0281
 See application file for complete search history.

(56) References Cited

U.S. PATENT DOCUMENTS

| 7,373,524 B2 * | 5/2008 | Motsinger | H04L 63/0876 713/193 |
| 2005/0198099 A1 * | 9/2005 | Motsinger | G06F 21/55 709/200 |
| 2008/0168392 A1 * | 7/2008 | Brooks | H04L 63/0263 715/810 |
| 2010/0325588 A1 * | 12/2010 | Reddy | H04L 63/0263 706/12 |
| 2014/0026226 A1 * | 1/2014 | Aoki | G06F 21/6263 726/26 |
| 2016/0094418 A1 * | 3/2016 | Raney | H04L 43/028 370/241 |

* cited by examiner

*Primary Examiner* — Cheng-Feng Huang

(57) ABSTRACT

Described embodiments provide systems and methods for selecting one or more firewall rules to apply to a server based at least on identifying a service of the server. A device intermediary to a plurality of clients and a serve may identify a pattern of a firewall to apply to a response from the server to a request from a client of the plurality of clients. The pattern may be to identify a service configured on the server. The device may determine that the response from the server matches the pattern. The device may identify, responsive to the response matching the pattern, that the service is configured on the server. The device may select, based at least on the service, one or more rules for the firewall to apply to responses from the server.

17 Claims, 13 Drawing Sheets

DYNAMICALLY SELECTING FIREWALL SIGNATURES USING NETWORK TRAFFIC

FIELD OF THE DISCLOSURE

The present application generally relates to firewalls. In particular, the present application relates to systems and methods for selecting one or more firewall rules to apply to a server based at least on identifying a service of the server.

BACKGROUND

A firewall may function as a barrier among network nodes. The firewall may monitor incoming and outgoing network traffic communicated among the network nodes and may control the flow of network traffic in accordance with a security policy. The security policy may be manually configured by a network administrator.

BRIEF SUMMARY

This summary is provided to introduce a selection of concepts in a simplified form that are further described below in the Detailed Description. This summary is not intended to identify key features or essential features nor is it intended to limit the scope of the claims included herewith.

In a networked environment, a firewall may reside on a gateway (also referred herein as a router, a proxy, or an intermediary) separating nodes of a protected network from nodes of an external, unprotected network. On the gateway, the firewall may monitor and control incoming network traffic from the external network as well as outgoing network from the nodes of the protected network. One type of firewall may be a web application firewall (WAF) that monitors and controls network traffic for a particular web application or service. For example, the WAF may monitor and control requests from clients to access resources hosted on a server for the web application as well as responses from the server in response to the requests.

Although able to provide security protections, configuring firewalls (e.g., WAFs) on gateways may be difficult and cumbersome. Vendors of firewalls may provide a multitude of firewall rules (sometimes referred herein as signatures) to protect against security vulnerabilities. In the context of WAFs, these signatures may provide security protections aimed at potential weaknesses and exposures in web application services (sometimes referred herein as technologies). One problem faced by administrators of gateways, however, may be on deciding which firewall rules to enable for protection. To properly configure the firewall rules, the network administrators should be aware of the firewall rules that are relevant for the backend services on the servers. Enabling all the firewall rules may often lead to a spike in computer processor usage and may also result in restrictions of requests due to false positives. As a consequence, the overall performance of the gateway enforcing the firewall rules may deteriorate, resulting in poor user experience with the overall network. On the other hand, disabling necessary protections or insufficiently configuring such rules may lead to exposure of the network to potential security vulnerabilities. These problems may be exacerbated with dynamic web services, where the services provided by the backend servers may change frequently. In such dynamic environments, modifying which firewall rules are to be enabled and disabled can be even more cumbersome, resulting in improper configuring of the firewall and decrease of performance of the gateway.

To account for these and other technical problems, firewall rules may be dynamically selected by a packet engine on the gateway based on analyzing client requests and server responses communicated via the gateway. In order to perform the dynamic selection, the packet engine may have an inbuilt set of predefined patterns to identify the various services. As network traffic is communicated between the clients and backend servers through the gateway, the packet engine may parse the network traffic to extract relevant information for analysis. The packet engine may store the extracted relevant information. The information stored on the database may be truncated once the contents are further parsed and analyzed.

Using the set of patterns, the packet engine may analyze the information extracted from network traffic to detect for markers that are associated with the presence of a service configured on the backend server. The services may include applications and interfaces enabled and executed on the server. The services may be classified into service type and each type may be further divided into the categories. The analysis of the network traffic, such as client requests or server responses in the form of Hypertext Transfer Protocol (HTTP) packets, may be performed in real-time. The patterns may include, for example, strings, regular expressions, key-value pairs in cookies, headers, addresses (e.g., a Uniform Resource Locator (URL)), extensions, and Hypertext Markup Language (HTML) content, such as script tags, hyperlinks, style sheets (e.g., Cascading Style Sheets) attributes, or classes, among others.

When the extracted information matches one of the patterns, the packet engine may determine that the service is configured on the backend server and mark the service as detected. If the number of responses matching the pattern satisfies a threshold for the category, the packet engine may halt scanning of the extracted information for the service. With the detection, the packet engine may identify the category to which the service is classified. The packet engine may further map the superset type to the corresponding firewall rules to select which firewall rules to enable. The packet engine may provide the selected firewall rules as a recommendation to the administrator of the gateway, and may apply the firewall rules to the firewall to control network traffic communicated through the gateway. In addition, a time window (e.g., x number of days) can be specified for a detected service. If no responses matching the pattern are received at the gateway through the time window, the packet engine may automatically deselect or disable the firewall rules for the service.

By dynamically selecting which firewall rules to enable and disable, the packet engine on the gateway may be able to properly configure the firewall rules that account for the services particular to the backend server. Firewall rules for services determined to be not configured on the server may be avoided, thereby freeing up and saving the consumption of computing resources and network bandwidth. The conservation of computing resources and network bandwidth result in the overall improvement to the performance of the firewall and the gateway. Additionally, the automatic selection of the firewall rules may reduce or eliminate the burden to administrators in manually configuring firewalls on gateways. The dynamic selection may further lower the onerous encumbrance to administrator from constantly updating and modifying firewall configurations due to changes in the services provided by the backend server.

Aspects of the present disclosure provide systems, methods, and non-transitory computer readable media for selecting one or more firewall rules to apply to a server based at least on identifying a service of the server. A device intermediary to a plurality of clients and a serve may identify a pattern of a firewall to apply to a response from the server to a request from a client of the plurality of clients. The pattern may be to identify a service configured on the server. The device may determine that the response from the server matches the pattern. The device may identify, responsive to the response matching the pattern, that the service is configured on the server. The device may select, based at least on the service, one or more rules for the firewall to apply to responses from the server.

In some embodiments, the device may identify, responsive to a number of responses from the server not matching a second pattern of the firewall satisfying threshold number, that a second service identified by the second pattern is not configured on the server. In some embodiments, the device may maintain non-selection of one or more second rules associated with the second service for the firewall to apply based at least on identifying that the second service is not configured on the server.

In some embodiments, the device may determine that a second response from the server matching the pattern is not received within a time window subsequent to selecting the one or more rules. In some embodiments, the device may identify that the service is not configured on the server responsive to the determining that the second response is not received within the time window. In some embodiments, the device may deselect the one or more rules for the firewall based at least on identifying that the service is not configured on the server.

In some embodiments, the device may identify, subsequent to selecting the one or more rules, a second response from the server as matching the pattern. In some embodiments, the device may apply the one or more rules selected for the firewall to the second response identified as matching the pattern.

In some embodiments, the device may determine that a number of responses from the server matching the pattern satisfies a threshold number. In some embodiments, the device may identify that the service is configured on the server, responsive to determining that the number of responses satisfies the threshold number.

In some embodiments, the device may identify a plurality of patterns of the firewall to the responses from the server to identify a corresponding plurality of services configured on the server. Each of the plurality of patterns may define at least one of a string set, a regular expression, or a key-value set. In some embodiments, the device may determine that information identified from a plurality of responses from the server matches the pattern.

In some embodiments, the device may identify, from a plurality of categories, a category for the service based at least on the pattern determined to be matched to the response. In some embodiments, the device may select the one or more rules for the firewall based at least on a category associated with a type for the service. The category may identify a plurality of types of services configured on the server. In some embodiments, the device may provide, for display, information identifying the one or more rules to apply to configure the firewall.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
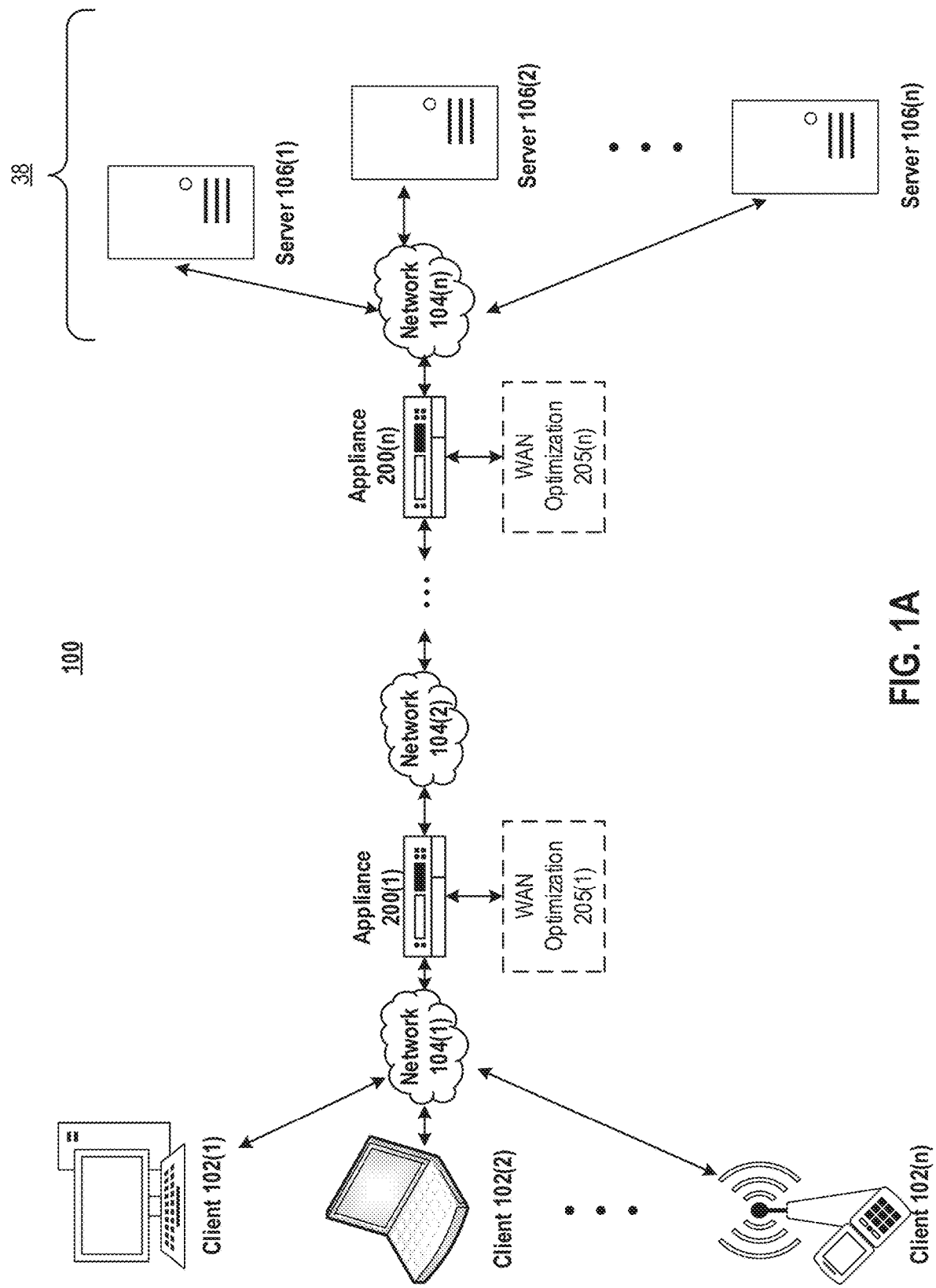
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for selecting firewall rules to apply to a server based on service configurations.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
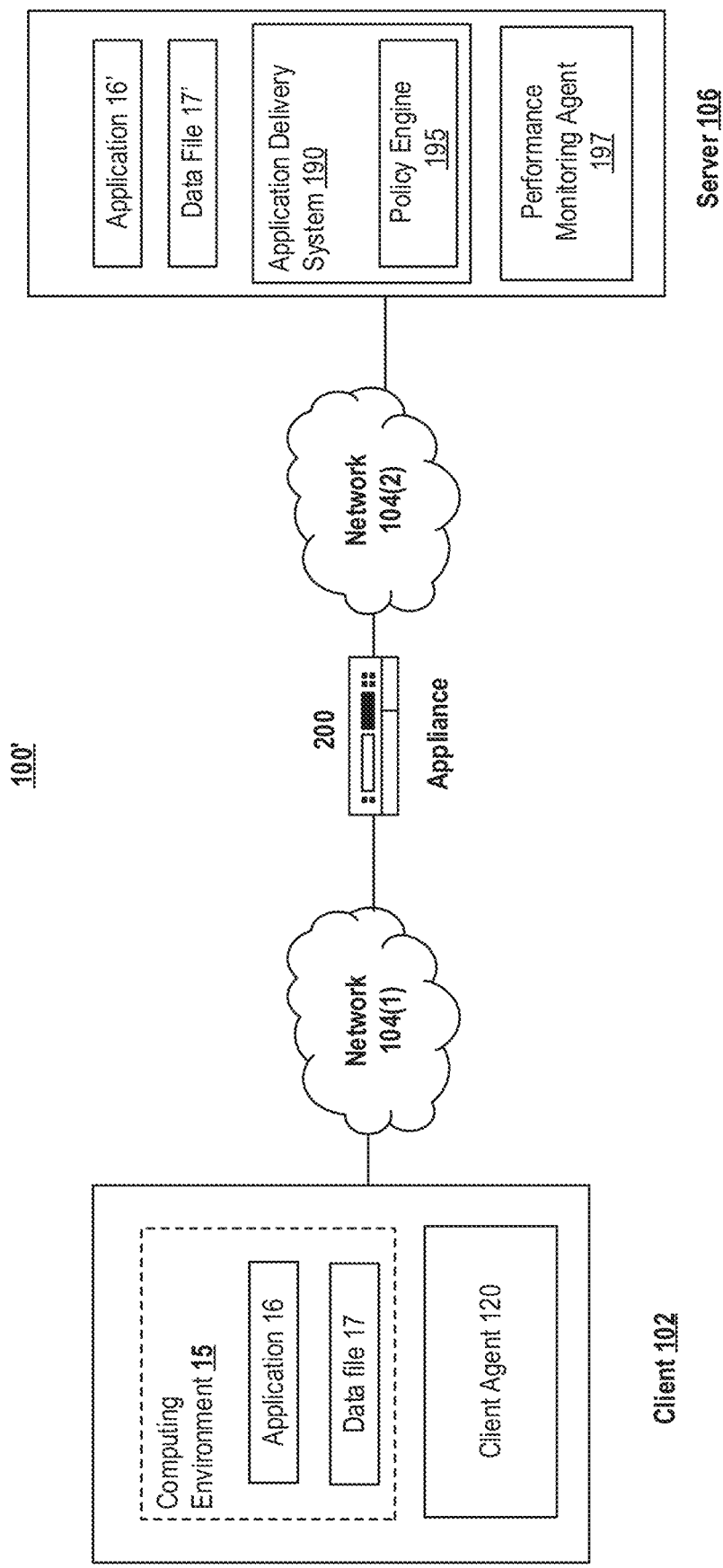
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection, and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS), or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management, and reporting, for example by software, hardware, or a combination thereof. Performance monitoring may include one or more agents for performing monitoring, measurement, and data collection activities on clients 102 (e.g., client agent 120), servers 106 (e.g., agent 197), or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EDGESIGHT by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics, may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
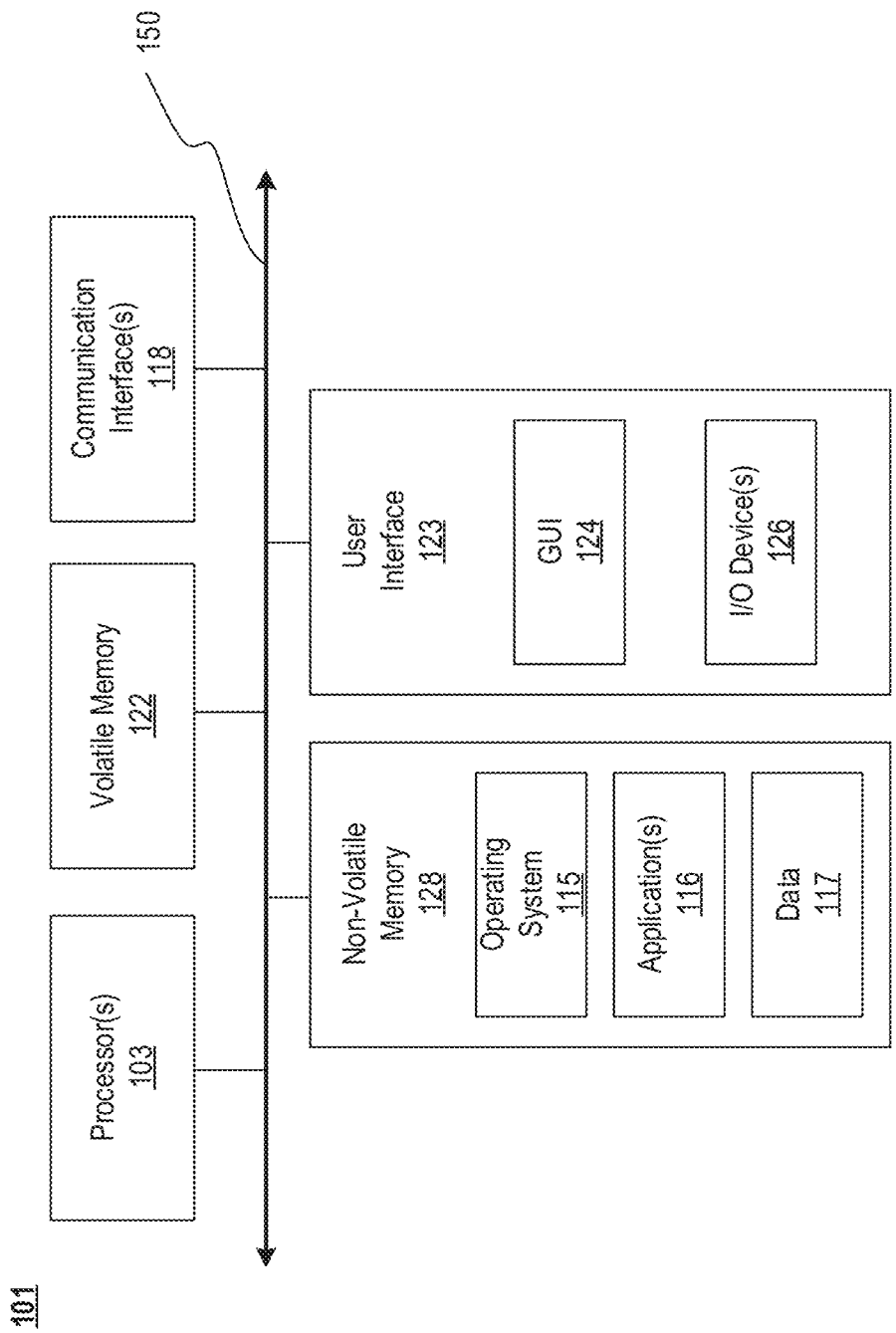
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
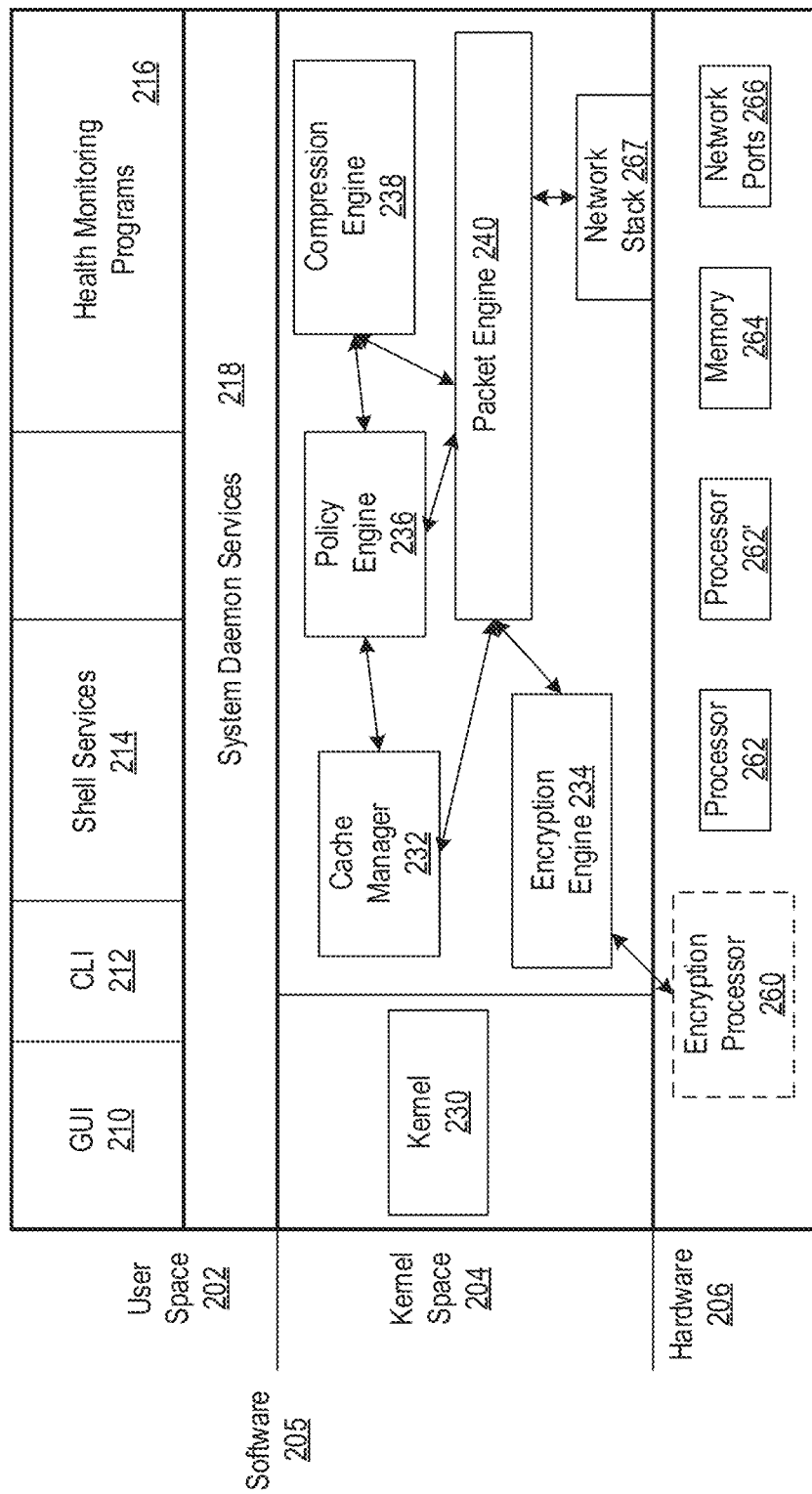
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge, or other type of computing or network device. As shown in FIG. 2, an embodiment of appliance 200 may include a hardware layer 206 and a software layer 205, divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports, and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service, or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication, and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
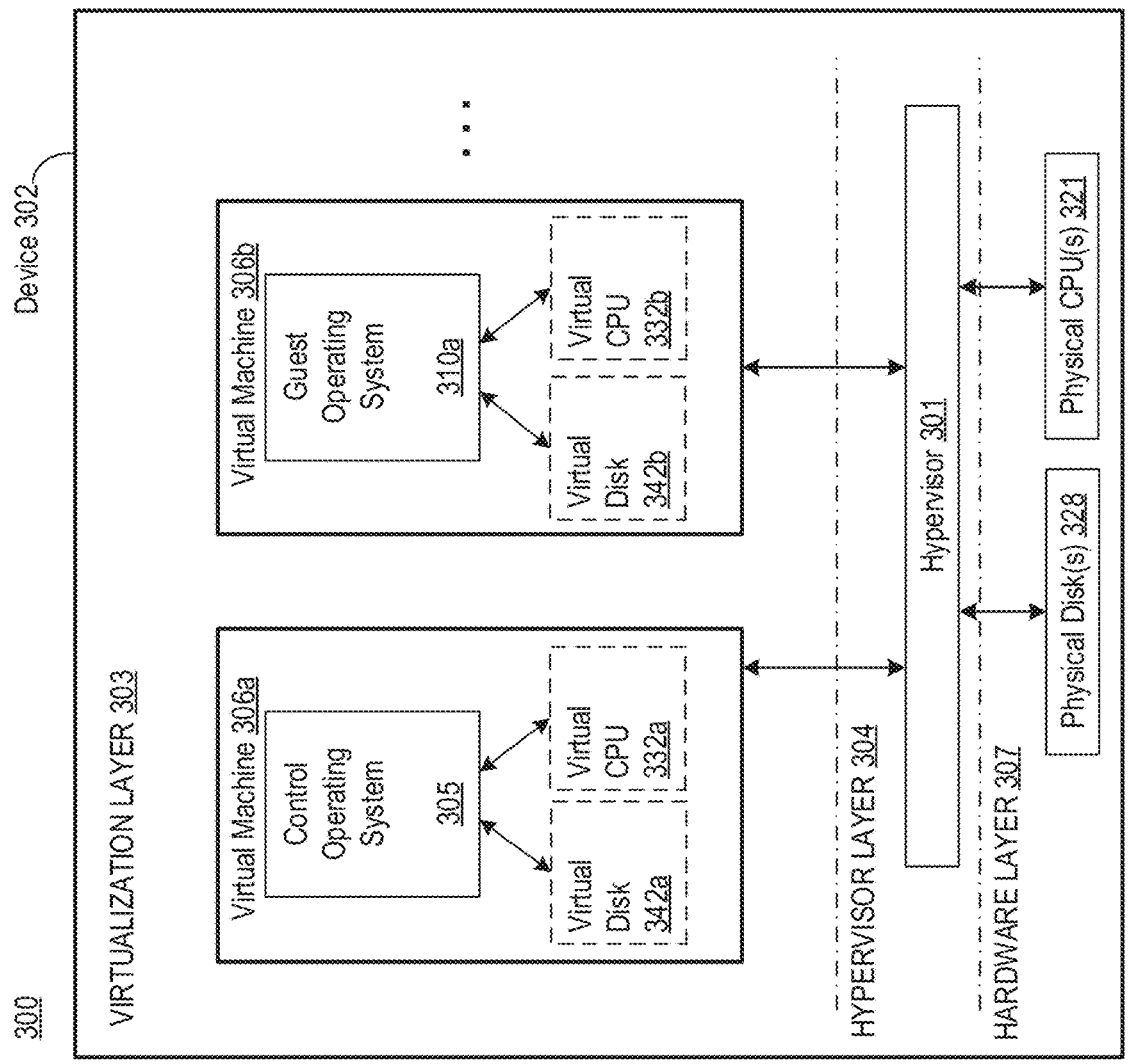
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regards to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load, or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106, or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
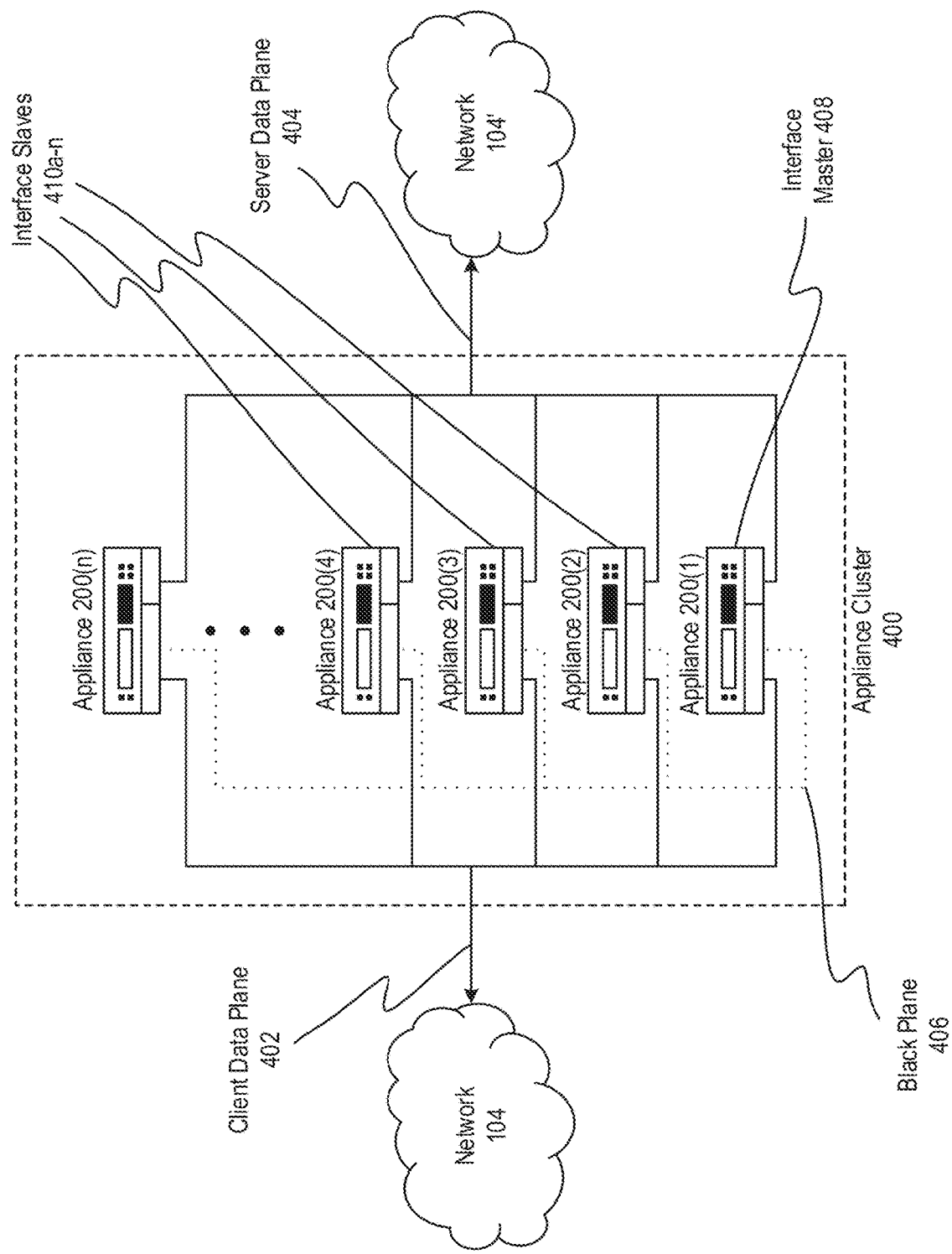
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similarly, to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or backplane 406. Backplane 406 may enable inter-node or inter-appliance control and configuration messages, for inter-node forwarding of traffic, and/or for communicating configuration and control traffic from an administrator or user to cluster 400. In some embodiments, backplane 406 may be a physical network, a VPN or tunnel, or a combination thereof.

Figure 5:
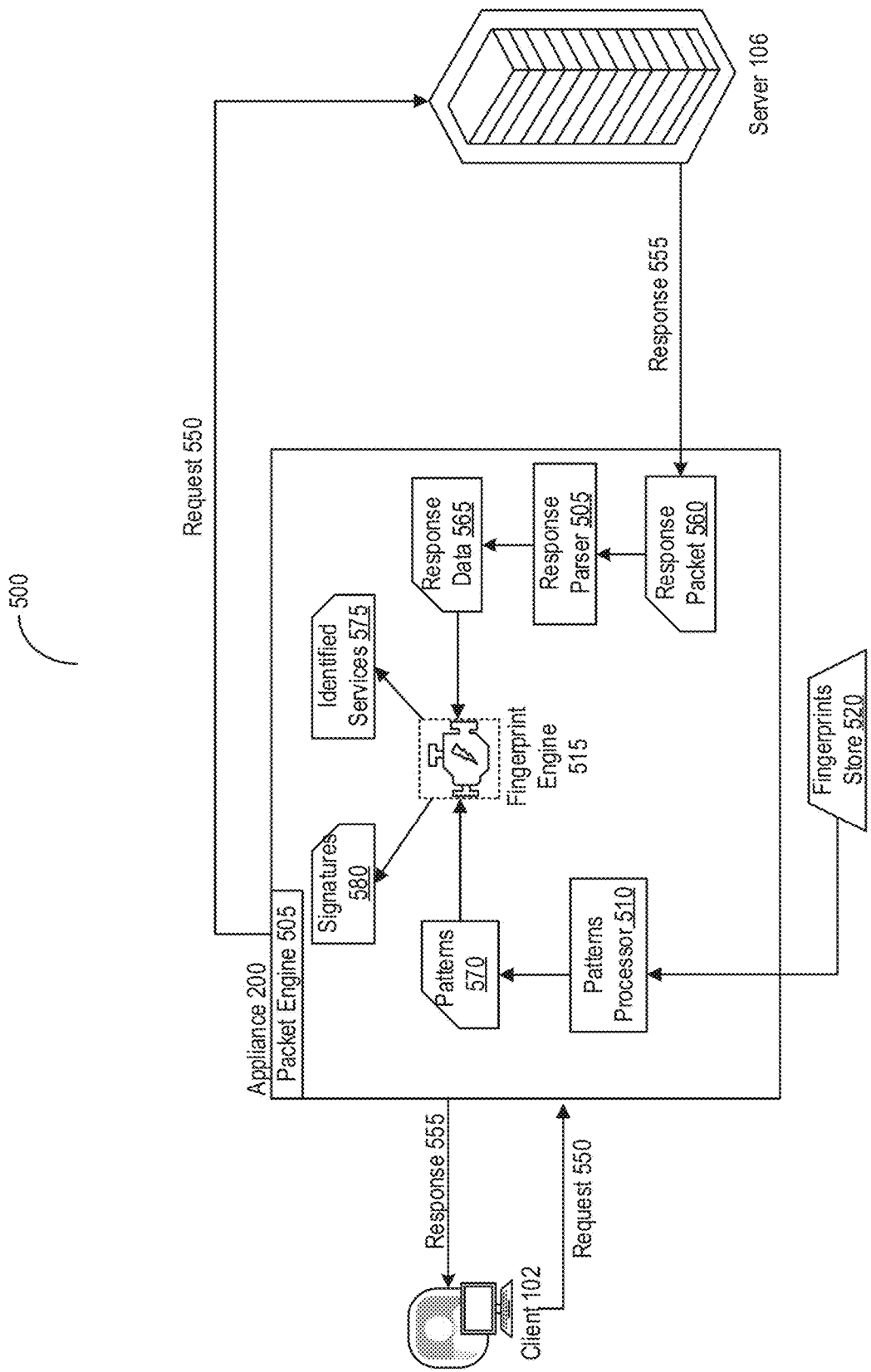
FIG. 5 is a block diagram of an embodiment of an environment for selecting firewalls rules to apply to server responses based on service configurations in accordance with an illustrative embodiment.

E. Systems and Methods for Selecting Firewall Rules to Apply to a Server Based on Identifying Service Configurations Referring now to FIG. 5, depicted is a block diagram an environment 500 for selecting firewalls rules to apply to server responses based on service configurations. The environment 500 may include at least one client 102, at least one server 106 (sometimes herein referred to as a backend server), and an appliance 200 (sometimes referred herein as an application delivery controller) deployed between the client 102 and the server 106. The appliance 200 may include at least one packet engine 505 and at least one fingerprints store 520. The packet engine 505 may turn include at least one response parser 505, at least one patterns processor 510, and at least one fingerprint engine 510, among others.

To access services hosted on the server 106, the client 102 may send a request 550 to the appliance 200. The appliance 200 in turn may forward the request 550 to the server 106. The server 106 may be configured with one or more services. The server 106 may perform an action specified by the request 555 using these services, and may return a response 555 to the appliance 200. Upon receipt, the appliance 200 may forward the response 555 to the client 102. In conjunction, the response parser 505 of the packet engine 505 may parse a response packet 560 corresponding to the response 555 to identify response data 565. The patterns processor 510 may analyze the response data 565 to match against patterns 570 from the fingerprints store 520 to identify services 575 configured on the server 106. Based on the matches, the fingerprint engine 515 may select signatures 580 corresponding to the services 575. Upon selection, the signatures 580 may be used by a firewall on the appliance 200 to permit, restrict, or otherwise control network traffic communicated through the appliance 200.

Figure 6:
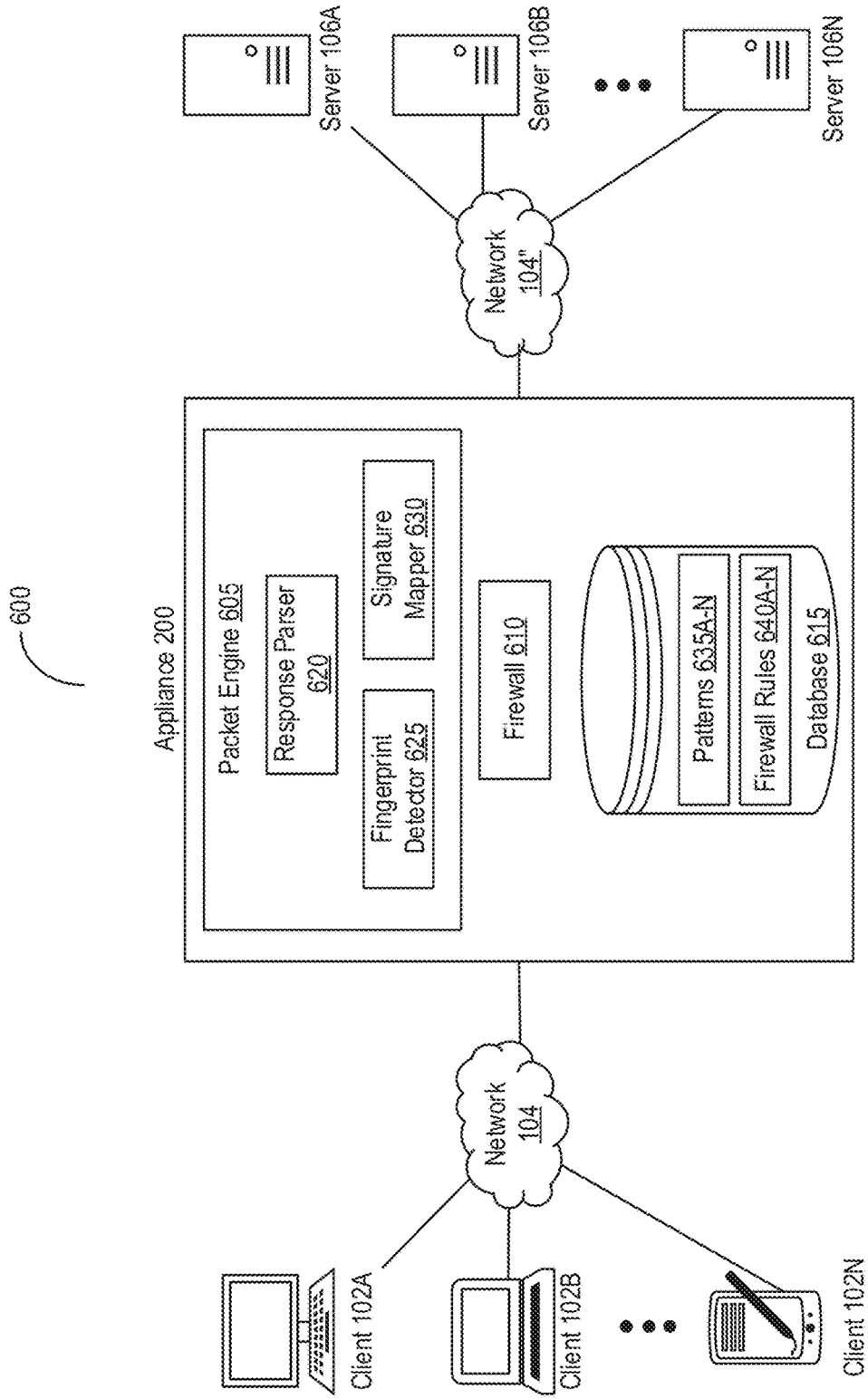
FIG. 6 is a block diagram of an embodiment of a system for selecting firewalls rules to apply to server responses based on service configurations in accordance with an illustrative embodiment.

Referring now to FIG. 6, depicted is a block diagram of a system 600 for selecting firewalls rules to apply to server responses based on service configurations. In overview, the system 600 may include at least one client 102a-n (hereinafter generally referred to as clients 102), one or more servers 106a-n (hereinafter generally referred to as servers 106), and at least one appliance 200 deployed between the clients 102 and the servers 106. The appliance 200 may include at least one packet engine 605, at least one firewall 610, and at least one database 615, among others. The packet engine 605 may include at least one response parser 620, at least one fingerprint detector 625, and at least one signature mapper 630. In some embodiments, the firewall 610 may be part of the packet engine 605. The database 615 may store, maintain, or otherwise include a set of patterns 635a-n (hereinafter generally referred to as patterns 635) and a set of firewall rules 640a-n (hereinafter generally referred to as firewall rules 640 and sometimes referred herein as signatures). The system 600 may perform the functionalities and operations detailed above with respect to system 500.

The systems and methods of the present solution may be implemented in any type and form of device, including clients, servers and/or appliances 200. As referenced herein, a "server" may sometimes refer to any device in a client-server relationship, e.g., an appliance 200 in a handshake with a client device 102. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

In further detail, the packet engine 605 and the firewall 610 on the appliance 200 may have a testing stage (also referred herein as a staging environment) and a deployment stage (also referred herein as a production environment). During the testing stage, the packet engine 605 may use the network traffic communicated between a subset or all of the clients 102 and the servers 106 via the appliance 200 for selecting firewall rules 640 to apply to the firewall 610. During the deployment stage, the firewall 610 may apply the selected firewall rules 640 to process and control the network traffic communicated between at least the subset of the clients 102 and the servers 106. In addition, the packet engine 605 may update the selection of the firewall rule 640 using the network traffic. The administrator of the appliance 200 may set the packet engine 605 and the firewall 610 to operating in the testing stage or the deployment stage.

Figure 7A:
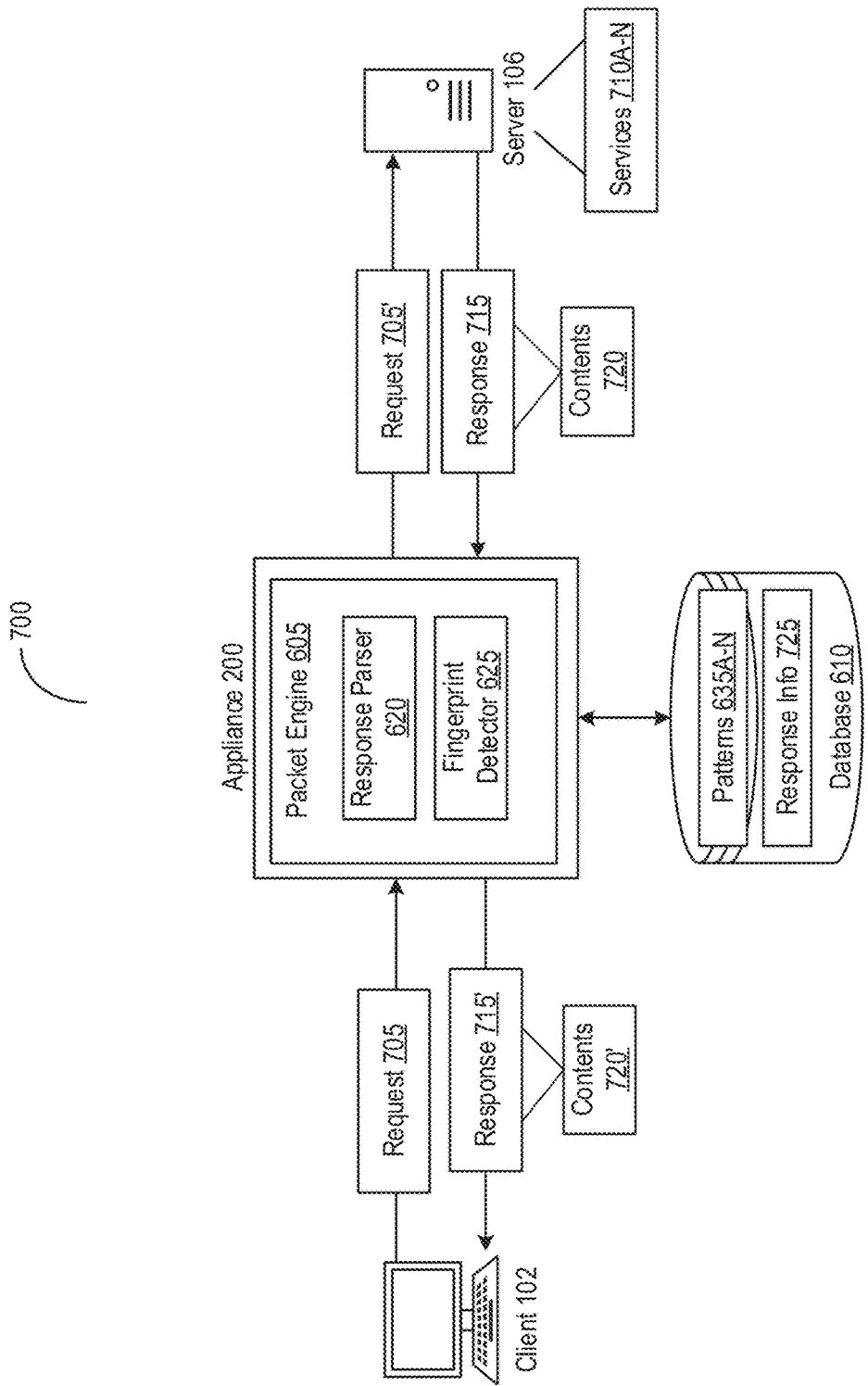
FIG. 7A is a block diagram of an embodiment of a process of detecting services configured on a server in a system for selecting firewalls rules to apply to server responses based on service configurations in accordance with an illustrative embodiment.

Referring now to FIG. 7A, depicted is a block diagram of an embodiment of a process 700 of detecting services configured on a server in a system 600 for selecting firewalls rules to apply to server responses based on service configurations. The process 700 may include operations of the packet engine 605 when in the testing stage. Under the process 700, the client 102 may provide, send, or otherwise transmit a request 705 to the appliance 200. The request 705 may be for the client 102 to access the server 106. For example, an application executing on the client 102 may generate the request 705 to access one or more resources hosted on the server 106. The application may include, for example, a web application accessed via a web browser, a standalone application (e.g., a native application), or any other script or executable that is to access the resources on the server 106. The resources may include processes or data hosted on the server 106 for running the application on the client 102. In turn, the appliance 200 may receive the request 705 from the client 102. The appliance 200 may forward or send the request 705 as request 705' to the server 106.

From the appliance 200, the server 106 may receive the request 705'. The server 106 may process, carry out, or otherwise execute one or more operations in accordance with the request 705'. The request 705' may entail or involve execution, invocation, or otherwise use of at least one service 710a-n (hereinafter generally referred to at the services 710 and also referred herein as a technology) on the server 106. The services 710 may include or correspond to processes, network-hosted applications, or interfaces configured on the server 106. For example, the services 710 may include content management services, such as Drupal™, WordPress™, and Joomla!™, among others. The services 710 may also include web server or web server interfaces, such as Apache™, Internet Information Services (IIS), and Nginx™, among others. The services 710 may also include a network application, such as a word processor and image editor provided in accordance with a software-as-a-service application (SaaS), among others. In processing the request 705', the server 106 may call or invoke one or more functions of the services 710 to generate at least one response 715. The response 715 may include contents 720 generated in accordance with the service 710 that was used to process the request 705'. The contents 720 may correspond to the data or information included in the response 715. For example, the contents 720 may include a header or a payload of an HTTP packet. With the generation of the response 715, the server 106 may return, provide, or otherwise the response 715 to the appliance 200.

The response parser 620 of the packet engine 605 executing on the appliance 200 may retrieve, identify, or otherwise receive the response 715 from the server 106. Upon receipt, the response parser 620 may create or generate a copy of the response 715 including the contents 620 for additional processing, and may pass or forward the response 715 as response 715' including contents 620' to the client 102. The response 715' may include contents 620' corresponding to the contents 620 of the response 715. In conjunction, the response parser 620 may parse the response 715 to extract or identify the contents 720 therefrom. In some embodiments, the response parser 620 may extract or identify a portion of the contents 720 from the response 715 to perform further analysis at the packet engine 605 for selection of the firewall rules 640. The portion correspond to a subset of the contents 720 relevant to the analysis.

To identify the portion, the response parser 620 may identify at least one header of a specified type from the contents 720 of the response 705. For example, the response parser 620 may extract a status code and a location header, including the fields and corresponding value. The response parser 620 may also identify a portion of the payload included in the contents 620 of the response 715. For instance, the response parser 620 may identify a portion of Hypertext Markup Language (HTML) code contained in the payload corresponding to a script object or an inline frame object, among others. Upon identification of the contents 720, the response parser 620 may store and maintain at least a portion of the contents 720 as response information 725 on the database 610. The response information 725 may include a multitude of responses 715 or the contents 720 extracted from a multitude of response 715 received and aggregated from the server 106. For example, the response information 725 may include contents 720 from previous responses 715 received and processed by the response parser 620. In some embodiments, the response parser 620 may maintain the identified portion of the contents 720 on the database 610.

The fingerprint detector 625 of the packet engine 605 executing on the appliance 200 may retrieve or identify the set of patterns 635. In some embodiments, the fingerprint detector 625 may access the database 610 to retrieve, obtain, or otherwise identify the set of patterns 635 maintain thereon. The set of patterns 635 may correspond to the one or more services 710 potentially configurable on the server 106. The set of patterns 635 may be grouped into types corresponding to various types of services 710. Each type may be further classified into categories corresponding to various categories for the services 710. The categories may define or correspond to individual processes, packages, interfaces, or applications, among others. For example, the types may include content management services, the web server interfaces, and network applications. The categories for the content management services may include Drupal™, WordPress™, and Joomla!™, among others. The categories for the web server interface may include Apache™, Internet Information Services (IIS), and Nginx™, among others.

Each pattern 635 may be for the firewall 610 to apply to responses 715 received from the server 106. Each pattern 635 may be used to detect or identify whether a corresponding service 710 is configured on the server 106 by comparing against the contents 720 (or response information 725) of the responses 715 from the server 106. Furthermore, each pattern 635 in the set may identify, specify, or otherwise define a string set, a regular expression, or key-value (also referred herein as field-value or attribute-value), among others, or any combination thereof to compare against for identifying the corresponding service 710. For example, one pattern 635A may include a field-value pair used to detect whether the server 106 is configured with a particular type of web server interface (e.g., NGINX) and another pattern 635B may include a regular expression used to determine whether the server 106 is configured with dynamic content management (e.g., AJAX™). The string set may define or include one or more sets of alphanumeric characters. The regular expression may specify or include a sequence of strings combined in accordance with a Boolean operation. The key-value may identify a field and a particular value for the field. In some embodiments, the pattern 635 may specify or define the string set, the regular expression, or the key-value to compare against over multiple responses 715 (e.g., using the response information 725). The set of patterns 635 may, for example, be of the following form as defined in a script such as JavaScript Object Notation (JSON):

```
{
  "Category": "Apache",
  "Type": "Web Server",
  "Patterns":
    [
      {
        "Location": "Header",
        "Pattern": {
          "server": "apache"
        }
      },
      {
        "Location": "Header",
        "Pattern": {
          "x-powered-by": "apache"
        }
      }
    ]
},
{
  "Category": "WordPress",
  "Type": "Content Management System",
  "Patterns":
    [
      {
        "Location": "Script",
        "Pattern": "/wp-content/"
      },
      {
        "Location": "Script",
        "Pattern": "/wp-admin/"
      },
      ...
    ]
}
```

With the identification, the fingerprint detector 625 may identify or determine whether the response 715 (or the portion of the contents 720 therein) correspond to or match with a pattern 635 of the set. The determination may be performed in response to receipt of the response 715 from the server 106. In some embodiments, the fingerprint detector 625 may determine whether the response information 725 aggregated from multiple responses 715 correspond to match with the patterns 635 of the set. The determination using the response information 725 from multiple response 715 may be performed upon request (e.g., from a network administrator of the appliance 200) or in accordance with a schedule.

In determining, the fingerprint detector 625 may compare the contents 720 of the response 715 (or the response information 725) with the pattern 635. When the pattern 635 is a string set, the fingerprint detector 625 may search through the contents 720 of the response 715 to determine whether any portion of the contents 720 contains the string set. When the pattern 635 is a regular expression, the fingerprint detector 625 may search for the strings within the contents 720 of the response 715 in accordance with the specifications of the regular expression to determine whether the contents 720 satisfy the specifications. When the pattern 635 is a key-value pair, the fingerprint detector 625 may find the field corresponding to the specified key in the contents 720 and check the value of field against the specifications. The fingerprint detector 625 may compare the response information 725 against the pattern 635 in a similar manner as with the contents 720 of the response 715.

If the response 715 is determined to match the pattern 635, the fingerprint detector 625 may determine or identify the corresponding service 710 as configured on the server 106. The fingerprint detector 625 may identify the 710 corresponding to the pattern 635. In some embodiments, the fingerprint detector 625 may select or identify a category for the identified service 710 corresponding to the pattern 635 determined to match to the response 715. As discussed above, the category may, for example, include the individual processes, packages, interfaces, or applications, among others. In addition, the fingerprint detector 625 may select or identify a type for the service 710 based on the identified category. As described above, the type of service 710 may include, for example, a content management system, a web server interface, or a network application, among others.

In some embodiments, the fingerprint detector 625 may use a counter to identify whether the service 710 corresponding to the pattern 625 as configured on the server 106 using a counter. The fingerprint detector 625 may maintain the counter for a number of responses 715 matching the pattern 635. Each time a response 715 used to form the response information 725 is determined to match the pattern 735, the fingerprint detector 625 may increment or update the counter. The fingerprint detector 625 may compare the counter to a threshold number. The threshold number may delineate a value for the number of matching responses 715 (or response information 725) at which to identify the service 710 as configured on the server 106.

When the number of responses 715 satisfies (e.g., is greater than or equal to) the threshold number, the fingerprint detector 625 may determine that service 715 is configured on the server 106. The fingerprint detector 625 may also halt or cease processing comparing responses 715 against the pattern 635, as the service 715 is identified as configured on the server 106. Moreover, the fingerprint detector 625 may identify another pattern 635 for another service 710 to compare against. In contrast, when the number of response 715 satisfies (e.g., less than) the threshold number, the fingerprint detector 625 may determine that the service 715 is not configured on the server 106. The fingerprint detector 625 may also continue to compare the responses 715 against the pattern 635. In some embodiments, the fingerprint detector 625 may identify the service 710 corresponding to the pattern 635 as indefinite as to whether service 710 is configured on the server 106.

On the other hand, if the response 715 is determined to not match the pattern 635, the fingerprint detector 625 may determine or identify the corresponding service 710 as not configured on the server 710. In some embodiments, the fingerprint detector 625 may use a counter for identifying whether the service 710 corresponding to the pattern 625 as configured on the server 106 using a counter. The fingerprint detector 625 may maintain the counter for a number of responses 715 not matching the pattern 635. Each time a response 715 used to form the response information 725 is determined to not match the pattern 735, the fingerprint detector 625 may increment or update the counter. The fingerprint detector 625 may compare the counter to a threshold number. The threshold number may delineate a value (e.g., a confidence threshold value) for the number of non-matching responses 715 (or response information 725) at which to identify the service 710 as not configured on the server 106.

When the number of responses 715 satisfies (e.g., is greater than or equal to) the threshold number, the fingerprint detector 625 may determine that service 715 is not configured on the server 106. In some embodiments, the fingerprint detector 625 may also halt or cease processing comparing responses 715 against the pattern 635, as the service 715 is identified as not configured on the server 106. Moreover, the fingerprint detector 625 may identify another pattern 635 for another service 710 to compare against. In contrast, when the number of response 715 satisfies (e.g., less than) the threshold number, the fingerprint detector 625 may also continue to process and compare the responses 715 against the pattern 635. The fingerprint detector 625 may also determine or identify the service 710 as not configured on the server 106. In some embodiments, the fingerprint detector 625 may identify the service 710 corresponding to the pattern 635 as indefinite as to whether service 710 is configured on the server 106.

Figure 7B:
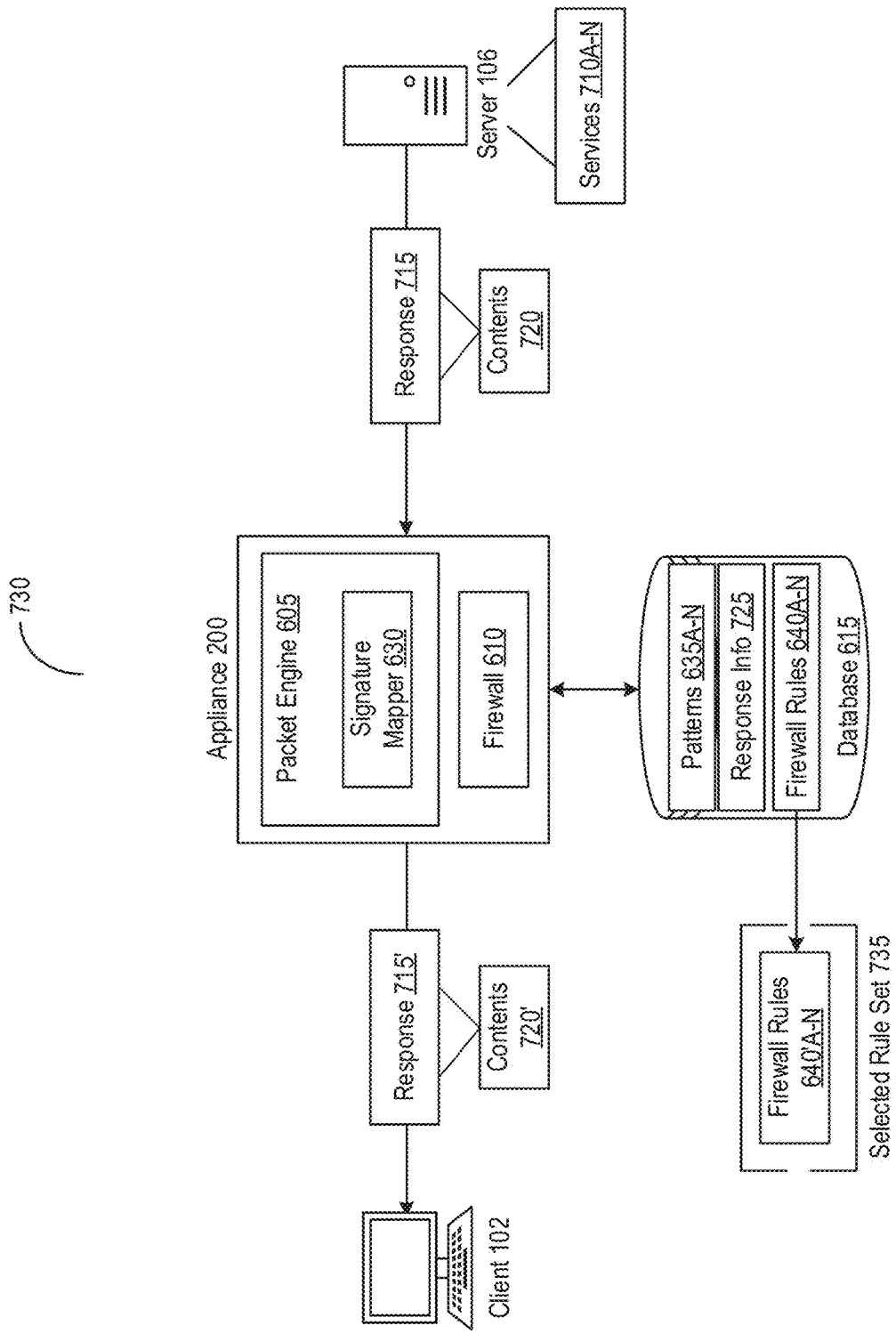
FIG. 7B is a block diagram of an embodiment of a process of mapping service configurations to firewall rules in a system for selecting firewalls rules to apply to server responses based on service configurations in accordance with an illustrative embodiment.

Referring now to FIG. 7B, depicted is a block diagram of a process 730 of mapping service configurations to firewall rules in a system 600 for selecting firewalls rules to apply to server responses based on service configurations. The process 730 may include operations of the packet engine 605 when in the testing stage. Under the process 730, the signature mapper 630 of the pattern engine 605 executing on the appliance 200 may retrieve, obtain, or otherwise identify the set of firewall rules 640. The set of firewall rules 640 may correspond to the one or more services 710 potentially configurable on the server 106. Each firewall rule 640 (sometimes referred herein as signatures) may identify, specify, or otherwise define a counteraction to apply to network traffic between the client 102 and the service 106 for a particular service 710.

The set of firewall rules 640 may be mapped to or correspond to the set of patterns 635. Each firewall rule 640 may correspond to one of the set of pattern 635. Conversely, each pattern 635 may correspond to one of more of the firewall rules 640. For example, a subset of firewall rules 640 may be applied for responses associated with a particular content management service as identified as configured on the server 106 using the pattern 635a. In addition, another subset of firewall rules 640 may be applied for responses associated with a SaaS application as identified as configured on the server 106 using another pattern 635b. In some embodiments, the set of firewall rules 640 may be classified by types and categories of service 710, similar to the classification of patterns 635 by types and categories as detailed above. The set may have subsets of firewall rules 640 classified by the type of service 710. For example, the firewall rules 640a-c may be for content management systems and firewall rules 640d-g may be for network applications. Within each subset, one or more firewall rules 640 may be classified by the category of services 710. Continuing from the previous example, from the subset of firewall rules 640 for content management systems, the firewall rule 640*a* may be for Drupal™, the firewall rule 640*b* may be for WordPress™, and the firewall rule 640*c* may be for Joomla!™

From the set of firewall rules 640, the signature mapper 630 may identify or select one or more firewall rules 640'*a-n* (hereinafter referred to as firewall rules 640') based on the services 710 identified as configured on the server 106. The firewall rules 640' selected from the overall set of firewall rules 640 may be included in a rule set 735 for application by the firewall 610. For each service 710 determined to be configured on the server 106 using the respective pattern 635, the signature mapper 630 may identify the one or more firewall rules 640' mapped to the pattern 635 from the set of firewall rules 640. In some embodiments, the signature mapper 630 may identify the category for the service 710 based on the classification of the pattern 635. The signature mapper 630 may identify the type of service 710 to which the category is classified. Using the classifications, the signature mapper 630 may select the firewall rules 640' from the set of firewall rules 640' for the category and type of service 710. Upon identification, the signature mapper 630 may select the firewall rules 640' to include as the selected rule set 735 for application to the firewall 610. In some embodiments, the signature mapper 630 may associate the firewall rules 640' to the corresponding patterns 635. The association may be used to identify responses that include content generated using the service 715.

Conversely, the signature mapper 630 may identify, exclude, or otherwise unselect one or more firewall rules 640 based on the services 710 identified as not configured on the server 106. If not selected, the firewall rules 640 may be unselected or excluded from the rule set 735 by default. For each service 710 determined to be not configured on the server 106 using the respective pattern 635, the signature mapper 630 may unselect the one or more firewall rules 640 mapped to the pattern 635 from the rule set 735. In some embodiments, the signature mapper 630 may identify the types and the categories of services 710 determined to be not configured on the service 710. When none of the categories of a particular type of service 710 is identified as not configured on the service 710, the signature mapper 630 may unselect or exclude the firewall rules 640 from the rule set 735. With the identifications, the signature mapper 630 may maintain the exclusion or non-selection of the firewall rules 640 from the rule set 735 for application to the firewall 610.

With the creation of the rule set 735, the signature mapper 630 may provide or apply the selected firewall rules 640' to the firewall 610. Each firewall rule 640' included in the rule set 735 may define a counteraction to apply to network traffic (e.g., the responses from the server 106) for the service 710 corresponding to the firewall rule 640'. Using the rule set 735, the firewall 610 may control (e.g., permit or restrict) responses received from the server 106. The signature mapper 630 may store and maintain the rule set 735 along with the firewall rules 640' on the database 615. The signature mapper 630 may also store and maintain the association between each firewall rule 640' and the corresponding pattern 635.

In some embodiments, the signature mapper 630 may send, transmit, or otherwise provide information including or identifying the rule set 735 for presentation or display. For example, the signature mapper 630 may provide the information for display on a user interface recommending the administrator of the appliance 200 to select one or more firewall rules 640' of the rule set 735. Using the user interface, the administrator may select which (e.g., all or a subset of) firewall rules 640' to apply to the firewall 610. The signature mapper 630 may identify or receive an indication of the selection of the firewall rules 640'. Upon receipt, the signature mapper 630 may apply the selected firewall rules 640' of the rule set 735 to the firewall 610.

Figure 7C:
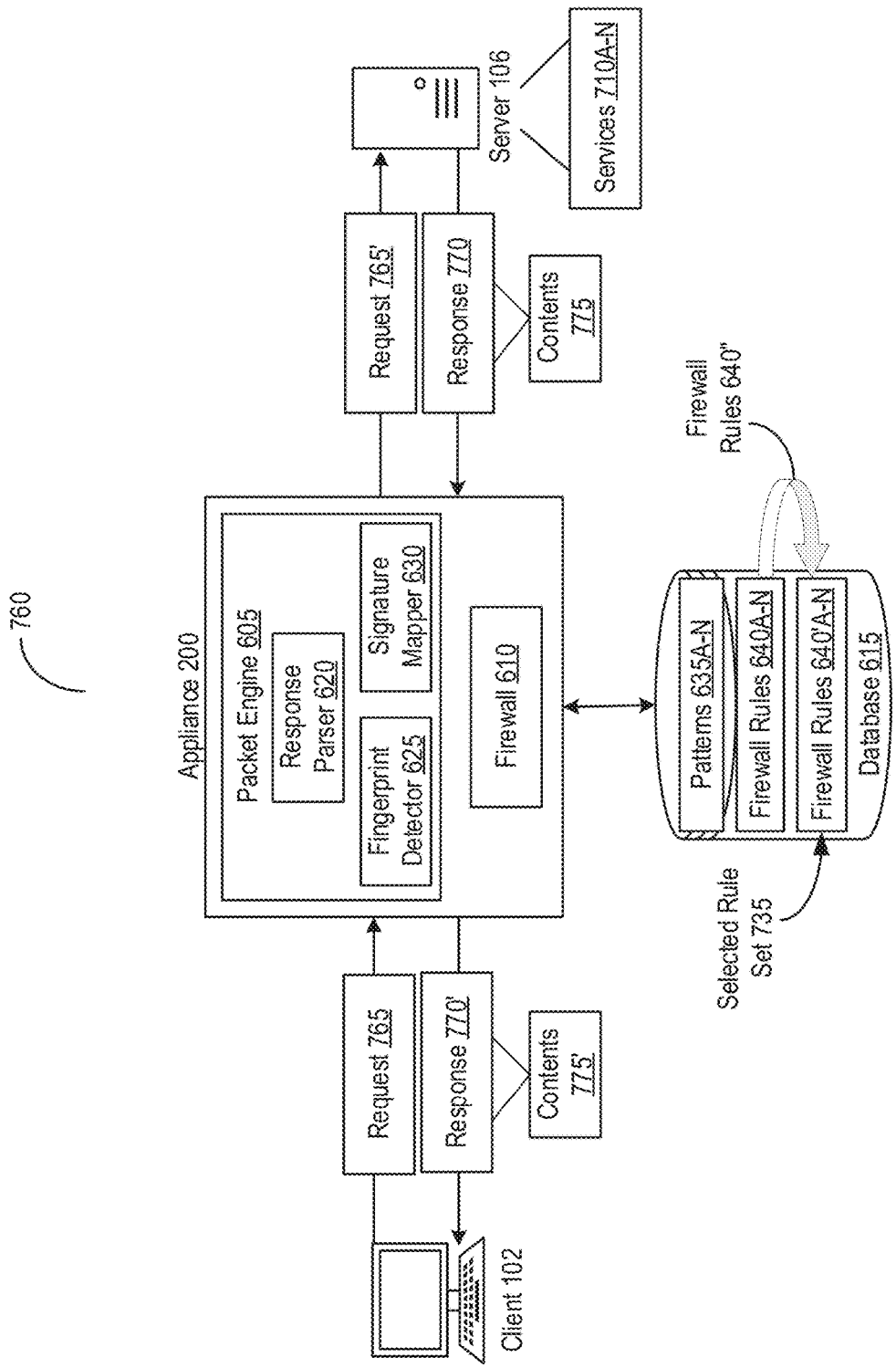
FIG. 7C is a block diagram of an embodiment of a process of applying firewall rules in a system for selecting firewalls rules to apply to server responses based on service configurations in accordance with an illustrative embodiment.

Referring now to FIG. 7C, depicted is a block diagram of a process 760 of applying firewall rules in a system for selecting firewalls rules to apply to server responses based on service configurations. The process 760 may include operations of the packet engine 605 when in the deployment stage. Under the process 760, the client 102 may provide, send, or otherwise transmit a request 765 to the appliance 200. The request 765 may be similar to the request 705 as discussed above. The request 765 may be for the client 102 to access the server 106. For example, an application executing on the client 102 may generate the request 765 to access one or more resources hosted on the server 106. In turn, the appliance 200 may receive the request 765 from the client 102. The appliance 200 may forward or send the request 765 as request 765' to the server 106.

The server 106 may receive the request 765' from the appliance 200. The server 106 may process, carry out, or otherwise execute one or more operations in accordance with the request 765'. The request 765' may entail or involve execution, invocation, or otherwise use of at least one service 710. In processing the request 765', the server 106 may call or invoke one or more functions of the services 710 to generate at least one response 770. The response 770 may include contents 775 generated in accordance with the service 710 that was used to process the request 765'. The contents 775 may correspond to the data or information included in the response 770. With the generation of the response 770, the server 106 may return, provide, or otherwise the response 770 to the appliance 200.

On the appliance 200, the firewall 610 may process the response 770 received from the server 106 in accordance with the firewall rules 640' of the rule set 735. In processing, the firewall 610 may permit, restrict, or otherwise control the response 770 using the firewall rules 640'. In some embodiments, the firewall 610 may pass or provide the response 770 to the packet engine 605 to analyze and determine whether to update the firewall rules 640' of the selected rule set 735. For each firewall rule 640', the firewall 610 may use a respective pattern 635 to determine whether the response 770 includes the content generated using the service 710 corresponding to the pattern 635. In some embodiments, the firewall 610 may identify the pattern 635 for the firewall rule 640' of the rule set 735 from the database 615. With the identification, the firewall 610 may determine whether the contents 775 of the response 770 match the pattern 635 associated with the firewall rule 640' of the rule set 735.

When the contents 775 of the response 770 match the pattern 635, the firewall 610 may determine that the response 770 includes content generated using the corresponding service 710. In addition, the firewall 610 may apply the counteraction specified by the firewall rule 640'. For example, when the counteraction specifies removal, the firewall 610 may modify the response 770 by removing the portion of the content from the response 770 generated using the service 710. The firewall 610 may also transmit the modified response 770 as response 770' to the client 102. The response 770' may include contents 775'. The contents 775' may include the remaining portion of the contents 775 from the original response 770. When the counteraction of the firewall rule 640' specifies blocking, the firewall 610 may prevent transmission of the response 770 to the client 102.

Otherwise, when the contents 775 of the response 770 do not match the pattern 635, the firewall 610 may determine that the response does not include any content generated using the corresponding service 710. The firewall 610 may also refrain from applying the one or more corresponding firewall rules 640' associated with the pattern 635 to the response 770. In addition, the firewall 610 may identify the next firewall rule 640' from the rule set 735 and the pattern 635 associated with the firewall rule 640' to check against. The firewall 610 may traverse through the firewall rules 640' of the rule set 735. When none of the patterns 635 associated with the firewall rules 640' of the rule set 735, the firewall 610 may pass, forward, or otherwise transmit the response 770 as the response 770' to the client 102. In some embodiments, the firewall 610 may pass or provide the response 770 to the packet engine 605 for additional analysis in response to determining that none of the patterns 635 associated with the firewall rules 640' match.

In conjunction, the response parser 620 may parse the response 770 to extract or identify the contents 720 therefrom for the updating of the selection of the firewall rules 640'. The operations of the response parser 620 with respect to the response 770 may be similar to the operations of the response parser 620 described above with respect to the response 705. In some embodiments, the response parser 620 may extract or identify a portion of the contents 775 from the response 720 to perform further analysis at the packet engine 605. To identify the portion, the response parser 620 may identify at least one header of a specified type from the contents 775 of the response 770. Upon identification of the contents 720, the response parser 620 may store and maintain at least a portion of the contents 720 as response information 725 on the database 610.

The fingerprint detector 625 may identify or determine whether the response 770 (or the portion of the contents 775 or the response information 725) correspond to or matching with one of the set of patterns 635. The operations of the fingerprint detector 625 with respect to the response 770 may be similar to the operations of the fingerprint detector 625 described above with respect to the response 705. The set of patterns 635 used to perform the determinations may exclude the patterns 635 associated with the selected firewall rules 640' of the rule set 735. To determine, the fingerprint detector 625 may compare the contents 775 of the response 770 with each pattern 635. If the response 770 is determined to match the pattern 635, the fingerprint detector 625 may identify the corresponding service 710 as configured on the server 106. Otherwise, if the response 770 is determined to not match the pattern 635, the fingerprint detector 625 may identify the corresponding service 710 as not configured on the server 106, and may identify another pattern 635 to compare against.

In some embodiments, the fingerprint detector 625 may identify or determine whether the service 710 is no longer configured on the server 106 based on the response 770 (or response information 725) from the server 106. A service 710 that was previously identified as configured on the server 106 may be later determined by the fingerprint detector 625 to be no longer on the server 106. For each service 710 identified as configured on the server 106, the fingerprint detector 625 may maintain a timer. The timer may keep track of an amount of time of the last response 770 received from the server 106 matching the pattern 635 corresponding to the service 710.

With the timer, the fingerprint detector 625 may compare the time to a threshold time window. The threshold time window may define or delineate a value for the amount of time at which the service 710 is to be determined no longer configured on the service 710. The threshold time window may be relative to the identification of the service 710 and by extension the selection of corresponding firewall rules 640' of the rule set 735. When the time is less than the threshold time window, the fingerprint detector 625 may maintain the identification that the service 710 as configured on the server 106. In addition, if the response 770 received from the server 106 is within the threshold time window, the fingerprint detector 625 may reset the time for the service 710. Conversely, when the time is greater than or equal to the threshold time window, the fingerprint detector 625 may determine or identify the service 710 as no longer configured on the service 710. The fingerprint detector 625 may also determine that the response 770 matching the pattern 635 is not received within the threshold time window.

Based on the services 710 identified to be configured on the service 610, the signature mapper 630 may select one or more firewall rules 640" from the overall set of the firewall rules 640 to update the rule set 735. For each service 710 determined to be configured on the server 106 using the respective pattern 635, the signature mapper 630 may identify the one or more firewall rules 640" mapped to the pattern 635 from the set of firewall rules 640. The signature mapper 630 may include the newly identified firewall rules 640" into the rule set 735. Conversely, the signature mapper 630 may continue to exclude firewall rules 640 for services 710 identified as not configured on the server 106. When the service 610 (that was previously identified as configured) is identified as no longer configured on the server 106, the signature mapper 630 may remove or deselect the corresponding firewall rules 640' from the rule set 735. Once updated, the signature mapper 630 may apply the modified rule set 735 to the firewall 610.

In this manner, the signature mapper 630 of the packet engine 605 on the appliance 200 may dynamically select firewall rules 640' for the rule set 735 to apply to the firewall 610 based on services 710 identified as configured on the server 106. From doing so, the appliance 200 may conserve consumption of computing resources and network bandwidth that would have otherwise been wasted in applying the firewall rules 640, especially for those associated with services 710 not actually configured on the service 710. Moreover, the automatic selection of the firewall rules 640' may reduce or eliminate the burden to administrators in manually configuring the firewall 610, and constant updating the configuration for changes in the services 710 available at the server 106.

Figure 8:
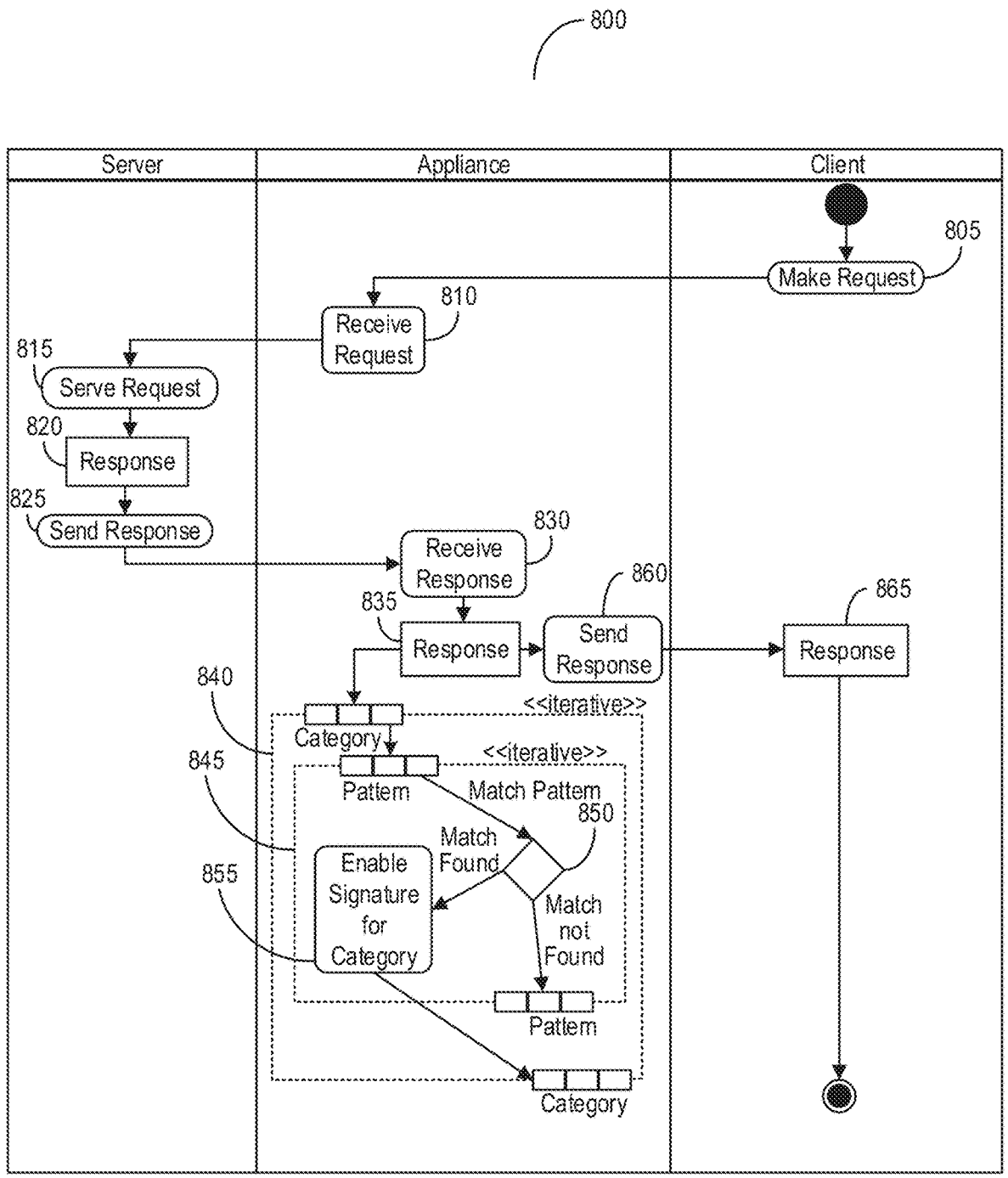
FIG. 8 is a communication diagram of an embodiment of a method of selecting firewalls rules to apply to server responses based on service configurations in accordance with an illustrative embodiment.

Referring now to FIG. 8, depicted is a communication diagram of a method 800 of selecting firewalls rules to apply to server responses based on service configurations in accordance. The functionalities of method 800 may be implemented using, or performed by, the components described above in conjunction with FIGS. 1-7C, such as the packet engine 605 of the appliance 200. As depicted, a client (e.g., the client 102) may make a request (e.g., the request 705) to transmit to an appliance (e.g., the appliance 200) (805). The appliance may receive the request and may forward the request to a server (e.g., the server 106) (810). The appliance may receive the request from the appliance (815). The appliance may process the request to generate a response (e.g., the response 715) (820). The server may send the response to the appliance (825). The appliance may receive the response from the server (830). The appliance may process the response (835). The appliance may iterate through categories of services in processing the response (840). The appliance may iterate through patterns for the categories (845). The appliance may determine whether the response matches the response (850). If the pattern matches, the appliance may enable the signature for the category (855). In conjunction, the appliance may send the response back to the client (860). The client may receive and process the response (865).

Figure 9:
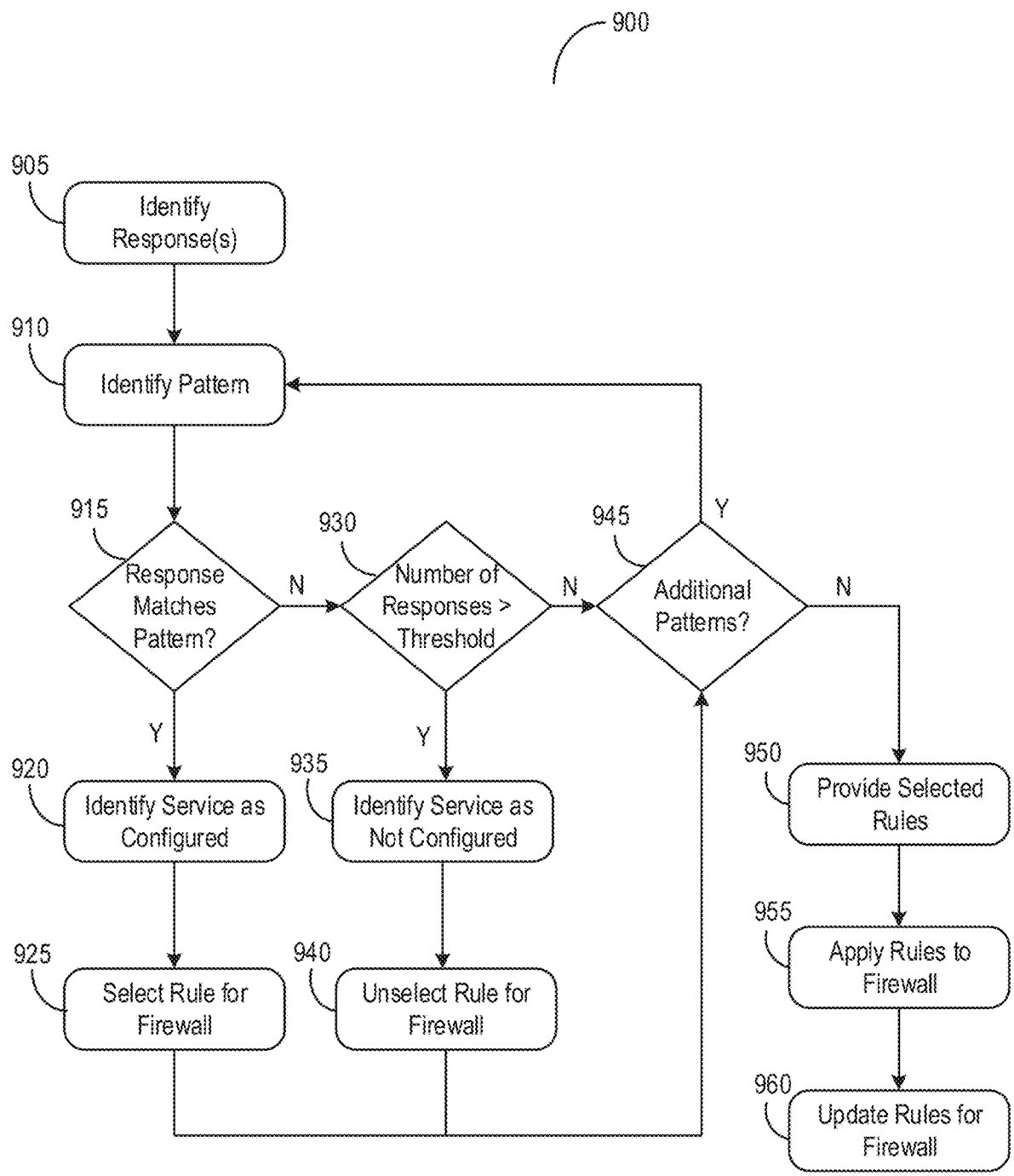
FIG. 9 is a flow diagram of an embodiment of a method for selecting firewalls rules to apply to server responses based on service configurations in accordance with an illustrative embodiment.

Referring now to FIG. 9, depicted is a flow diagram of a method 900 for selecting firewalls rules to apply to server responses based on service configurations. The functionalities of method 900 may be implemented using, or performed by, the components described above in conjunction with FIGS. 1-7C, such as the packet engine 605 of the appliance 200. In brief overview, a packet engine may identify one or more responses (905). The packet engine may identify a pattern (910). The packet engine may determine whether the response matches the pattern (915). If the response is determined to match the pattern, the packet engine may identify a service as configured (920). The packet engine may select a rule for a firewall (925). In contrast, if the response is determined to not match the pattern, the packet engine may determine whether a number of responses satisfies a threshold (930). When the number of responses satisfies the threshold, the packet engine may identify the service as not configured (935). The packet engine may also unselect the rule for the firewall (940). Continuing on, the packet engine may determine whether there are additional patterns (945). If there are no more patterns, the packet engine may provide the selected rules (950). The packet engine may apply the rules to the firewall (955). The packet engine may update the rules for the firewall (960).

In further detail, a packet engine (e.g., the packet engine 605) may retrieve, receive, or otherwise identify one or more responses (e.g., the response 715') (905). Each response may be received from a server (e.g., the server 106) generated and transmitted in response to a request (e.g., the request 705') originating from a client (e.g., the client 102). The server may use a service (e.g., the service 710) to process the request and generate the response to send to the packet engine on an appliance (e.g., the appliance 200). Upon receipt, the packet engine may parse the response to identify contents (e.g., the contents 720) therein. The packet engine may identify a relevant portion of the contents and store information (e.g., the response information 725) on a database (e.g., the database 615).

The packet engine may retrieve, obtain, or otherwise identify a pattern (e.g., the pattern 635) to compare against the response (910). The packet engine may identify a set of patterns from the database. Each pattern in the set may define a string set, a regular expression, or a key value to compare against the response to identify whether the server is configured with a corresponding service. Each pattern may correspond to a service potentially available or configurable on the service. Each pattern and by extension, each service may be classified by a type and a category. Each type may include one or more categories for the service.

The packet engine may identify or determine whether the response matches the pattern (915). With the identification, the packet engine may compare the pattern against the response. When the response satisfies the specifications of the pattern, the packet engine may determine that the response matches the pattern. Otherwise, when the response does not satisfy the specifications of the pattern, the packet engine may determine that the response does not match the pattern.

If the response is determined to match the pattern, the packet engine may determine or identify a service as configured (920). The packet engine may identify the service corresponding to the pattern determined to match the pattern. In addition, the packet engine may identify the category for the identified service, and may also identify a type for the service to which the category is classified. The packet engine may identify or select a rule (e.g., the firewall rules 640') for a firewall (e.g., the firewall 610) (925). The selected rule may correspond to the service identified as configured. The packet engine may also identify other rules that are associated with the category and overall type of service. Each rule may specify a counteraction to be performed by the firewall when a response containing contents generated using the service is received at the appliance. By selecting, the packet engine may enable the rule on the firewall.

In contrast, if the response is determined to not match the pattern, the packet engine may identify or determine whether a number of responses satisfies a threshold (930). The packet engine may maintain a counter for the number of responses that do not match the pattern. Each time a response is determined to not match the pattern, the packet engine may increment or update the counter. When the number of responses satisfies the threshold, the packet engine may determine or identify the service as not configured (935). The packet engine may also identify the category and type for the service. The packet engine may also unselect the rule for the firewall (940). In unselecting the rule, the packet engine may disable the rule on the firewall. Continuing on, the packet engine may determine whether there are additional patterns (945). If there are additional patterns, the packet engine may identify the next pattern to compare against and repeat the operations under (910)-(945).

If there are no more patterns, the packet engine may provide the selected rules (950). The packet engine may provide information regarding the selected rules for presentation (e.g., using a graphical user interface) as a recommendation to an administrator of the appliance or the firewall. The administrator may configure the firewall using the presented information. Upon receipt of the indication from the administrator, the packet engine may provide the selected rules to the firewall.

The packet engine may apply the rules to the firewall (955). The firewall may process responses from the server in accordance with the selected rules. Upon receipt of a response (e.g., the response 770), the firewall may use a pattern to determine whether contents (e.g., the contents 775) of the response are generated using the service on the server. When the pattern matches, the firewall may modify or restrict the response in accordance with the corresponding rule. Otherwise, the firewall may allow passage of the response to the client if none of firewall rules are not applied.

The packet engine may update the rules for the firewall (960). The packet engine may select addition rules to be applied at the firewall, when a service is identified as configured on the server based on parsing a subsequently received response. Conversely, the packet engine may deselect rules, when a response containing contents generated using a previously identified service is not received within a threshold time window. The packet engine may maintain a counter for each pattern associated with a selected rule.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from, and embedded in, one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method of selecting one or more firewall rules to apply to a server based at least on identifying a service of the server, comprising:
   identifying, by a device intermediary to a plurality of clients and a server, a first pattern of a firewall to apply to a response from the server to a request from a client of the plurality of clients, the first pattern to identify a first service configured on the server;
   determining, by the device, that the response from the server matches the first pattern;
   identifying, by the device responsive to the response matching the first pattern, that the first service is configured on the server;
   selecting, by the device based at least on the first service, one or more first rules for the firewall to apply to responses from the server;
   identifying, by the device responsive to a number of responses from the server that do not match a second pattern of the firewall satisfying threshold number, that a second service identified by the second pattern is not configured on the server; and
   maintaining, by the device, non-selection of one or more second rules associated with the second service for the firewall to apply based at least on identifying that the second service is not configured on the server.

2. The method of claim 1, further comprising:
   determining, by the device, that a second response from the server matching the first pattern is not received within a time window subsequent to selecting the one or more first rules;
   identifying, by the device, that the first service is not configured on the server responsive to the determining that the second response is not received within the time window; and
   deselecting, by the device, the one or more first rules for the firewall based at least on identifying that the first service is not configured on the server.

3. The method of claim 1, further comprising:
   identifying, by the device subsequent to selecting the one or more first rules, a second response from the server as matching the first pattern; and
   applying, by the device, the one or more first rules selected for the firewall to the second response identified as matching the first pattern.

4. The method of claim 1, further comprising determining, by the device, that a second number of responses from the server matching the first pattern satisfies a threshold number; and
   wherein identifying further comprises identifying that, the first service is configured on the server, responsive to determining that the second number of responses satisfies the threshold number.

5. The method of claim 1, wherein identifying the first pattern further comprises identifying a plurality of patterns of the firewall to the responses from the server to identify a corresponding plurality of services configured on the server, each of the plurality of patterns defining at least one of a string set, a regular expression, or a key-value set.

6. The method of claim 1, wherein determining that the response matches the first pattern further comprises determining that information identified from a plurality of responses from the server matches the first pattern.

7. The method of claim 1, wherein identifying that the first service is configured on the server further comprises identifying, from a plurality of categories, a category for the first service based at least on the first pattern determined to be matched to the response.

8. The method of claim 1, wherein selecting the one or more first rules further comprises selecting the one or more first rules for the firewall based at least on a category associated with a type for the first service, the category identifying a plurality of types of services configured on the server.

9. The method of claim 1, further comprising providing, by the device for display, information identifying the one or more first rules to apply to configure the firewall.

10. A system for one or more firewall rules to apply to a server based at least on identifying a service of the server, comprising:
   a device having one or more hardware processors coupled with hardware memory intermediary between a plurality of clients and a server, configured to:
      identify a first pattern of a firewall to apply to a response from the server to identify a service configured on the server to a request from a client of the plurality of clients, the first pattern to identify a service configured on the server;
      determine that the response from the server matches to the first pattern;
      identify, responsive to the response matching the first pattern, that the service is configured on the server;
      select, based at least on the service, one or more first rules for the firewall based at least on the service to apply to responses from the server;
      identify, responsive to a number of responses from the server that do not match a second pattern of the firewall satisfying threshold number, that a second service identified by the second pattern is not configured on the server; and
      maintain non-selection of one or more second rules associated with the second service for the firewall to apply based at least on identifying that the second service is not configured on the server.

11. The system of claim 10, wherein the device is further configured to:
   determine that a second response from the server matching the first pattern is not received within a time window subsequent to selecting the one or more first rules;
   identify that the first service is not configured on the server responsive to the determining that the second response is not received within the time window; and
   deselect the one or more first rules for the firewall based at least on identifying that the first service is not configured on the server.

12. The system of claim 10, wherein the device is further configured to:
   identify, subsequent to selecting the one or more first rules, a second response from the server as matching the first pattern; and
   apply the one or more first rules of the firewall to the second response identified as matching the first pattern.

13. The system of claim 10, wherein the device is further configured to:
   determine that a second number of responses from the server matching the first pattern satisfies a threshold number; and
   identify that the first service is configured on the server, responsive to determining that the second number of responses satisfies the threshold number.

14. The system of claim 10, wherein the device is further configured to identify a plurality of patterns of the firewall to the responses from the server to identify a corresponding plurality of services configured on the server, each of the plurality of patterns defining at least one of a string set, a regular expression, or a key-value set.

15. The system of claim 10, wherein the device is further configured to provide, for display, information identifying the one or more first rules to apply to configure the firewall.

16. A non-transitory computer readable medium storing program instructions for causing one or more processors to:
   identify a first pattern of a firewall to apply to a response from the server to identify a first service configured on the server to a request from a client of a plurality of clients, the first pattern to identify a first service configured on the server;
   determine that the response from the server matches to the first pattern;
   identify, responsive to the response matching the first pattern, that the first service is configured on the server;
   select, based at least on the first service, one or more first rules for the firewall based at least on the first service to apply to responses from the server;
   identify, responsive to a number of responses from the server that do not match a second pattern of the firewall satisfying threshold number, that a second service identified by the second pattern is not configured on the server; and
   maintain non-selection of one or more second rules associated with the second service for the firewall to apply based at least on identifying that the second service is not configured on the server.

17. The non-transitory computer readable medium of claim 16, wherein the program instructions further cause the one or more processors to:
   determine that a second response from the server matching the first pattern is not received within a time window subsequent to selecting the one or more first rules;
   identify that the first service is not configured on the server responsive to the determining that the second response is not received within the time window; and
   deselect the one or more first rules for the firewall based at least on identifying that the first service is not configured on the server.

\* \* \* \* \*